United States Patent
Borra et al.

(10) Patent No.: US 11,327,952 B2
(45) Date of Patent: May 10, 2022

(54) MULTIVARIATE AUTO-DIFFERENTIAL CORRELATION ENGINE IN A COMPUTING ENVIRONMENT

(71) Applicant: Salesforce.com, Inc., San Francisco, CA (US)

(72) Inventors: Ajay Krishna Borra, Hyderabad (IN); Gokulakrishnan Gopalakrishnan, Hyderabad (IN); Manpreet Singh, Hyderabad (IN); Brian Toal, San Francisco, CA (US); Laksh Venka, San Francisco, CA (US); Metarya Ruparel, Hyderabad (IN)

(73) Assignee: salesforce.com, Inc., San Francisco, CA (US)

( * ) Notice: Subject to any disclaimer, the term of this patent is extended or adjusted under 35 U.S.C. 154(b) by 312 days.

(21) Appl. No.: 16/563,204

(22) Filed: Sep. 6, 2019

(65) Prior Publication Data

US 2021/0073200 A1 Mar. 11, 2021

(51) Int. Cl.
*G06F 7/00* (2006.01)
*G06F 17/00* (2019.01)
*G06F 16/23* (2019.01)

(52) U.S. Cl.
CPC ...... *G06F 16/2365* (2019.01); *G06F 16/2379* (2019.01)

(58) Field of Classification Search
None
See application file for complete search history.

(56) References Cited

U.S. PATENT DOCUMENTS

| | | | |
|---|---|---|---|
| 9,509,710 B1 * | 11/2016 | Barry | G06F 16/24568 |
| 2016/0350173 A1 * | 12/2016 | Ahad | G06F 11/0751 |
| 2017/0075721 A1 * | 3/2017 | Bishop | G06F 9/4881 |
| 2018/0276042 A1 | 9/2018 | Toal | |
| 2018/0276285 A1 | 9/2018 | Toal | |
| 2018/0276288 A1 | 9/2018 | Toal et al. | |
| 2018/0324272 A1 | 11/2018 | Toal et al. | |
| 2018/0349323 A1 | 12/2018 | Borra et al. | |
| 2018/0365036 A1 | 12/2018 | Toal et al. | |
| 2019/0207969 A1 * | 7/2019 | Brown | G06F 21/552 |
| 2019/0220314 A1 | 7/2019 | Borra et al. | |

* cited by examiner

*Primary Examiner* — Tuan A Pham
(74) *Attorney, Agent, or Firm* — Kwan & Olynick LLP

(57) ABSTRACT

A metric data stream for a plurality of metrics may be retrieved from a database system. Each metric may measure a respective computing characteristic. The metric data stream may include a plurality of values for each of a sequence of time intervals. Each value may correspond with a respective one of the metrics. A plurality of metric correlation matrices may be determined for the metrics, each of which is associated with a respective time period in the metric data stream. A subset of comparison metric correlation matrices may be selected from the plurality of metric correlation metric matrices. A designated anomaly score may be determined for a designated time period by comparing a designated metric correlation matrix associated with the designated time period with the selected subset of comparison metric correlation metric matrices.

19 Claims, 10 Drawing Sheets

MULTIVARIATE AUTO-DIFFERENTIAL CORRELATION ENGINE IN A COMPUTING ENVIRONMENT

FIELD OF TECHNOLOGY

This patent document relates generally to database systems and more specifically to detecting computing system events based on metrics stored in database systems.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Cloud computing systems and other types of online environments are susceptible to variation in service. For example, traffic may vary day-to-day, hour-to-hour, and minute-to-minute. Systems may also be subject to malicious or inadvertently disruptive activity, such as an unusual number of requests.

BRIEF DESCRIPTION OF THE DRAWINGS

The included drawings are for illustrative purposes and serve only to provide examples of possible structures and operations for the disclosed inventive systems, apparatus, methods and computer program products for detecting computing system events based on metrics stored in database systems. These drawings in no way limit any changes in form and detail that may be made by one skilled in the art without departing from the spirit and scope of the disclosed implementations.

DETAILED DESCRIPTION

Figure 1:
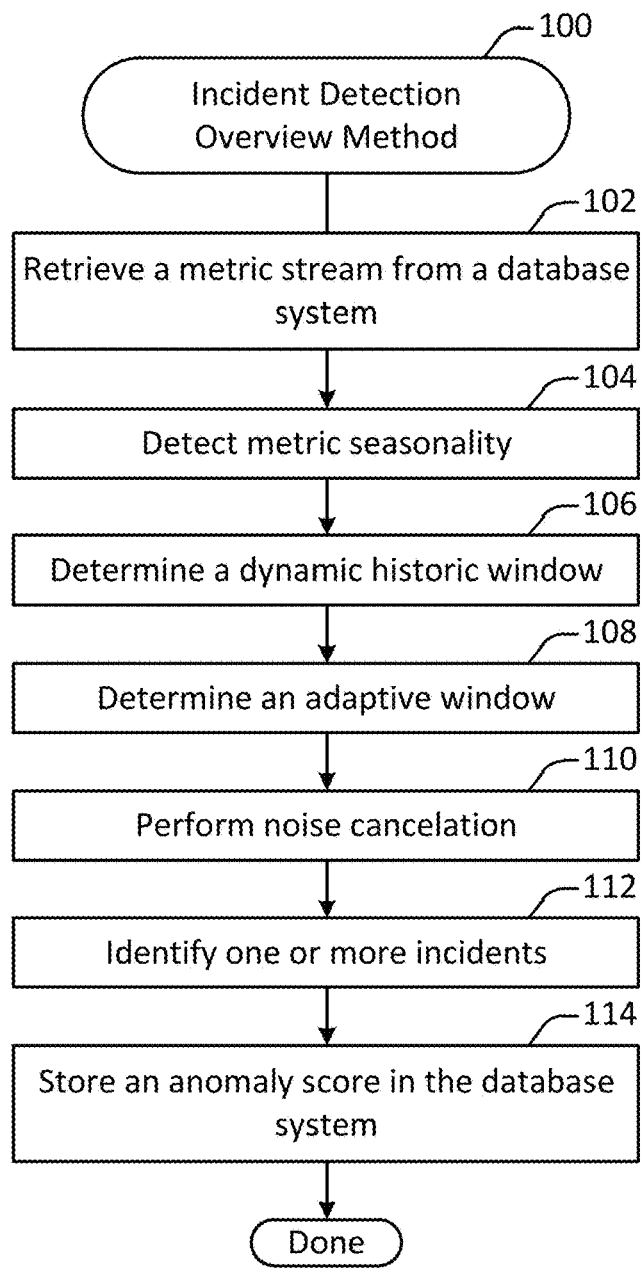
FIG. 1 illustrates an example of an overview method for detecting an incident, performed in accordance with one or more embodiments.

Internet-connected computing environments are complex systems. They experience significant variation in network traffic, performance characteristics, workload, and along many other dimensions. Anomalous events, also referred to as incidents, can create problems in internet-connected computing environments. Such events may include, but are not limited to: denial of service attacks, unusual numbers of service requests, unusual workloads, or any other type of unusual activity.

Robust detection of incidents is a difficult problem. Internet-connected computing environments such as on-demand computing services environments record telemetry data for many characteristics, for instance for logging and reporting services. However, metric values are susceptible to natural variation. In addition, metrics such as network traffic may vary according to seasonal patterns, for instance on a daily, weekly, or yearly basis.

Conventional systems for anomaly detection rely on static or dynamic thresholds implemented for a single variable. Conventional systems for anomaly also detection ignore contextual information about the relationships between multiple metrics. By focusing on individual metrics, conventional systems exhibit limited accuracy and miss potential incidents. Although conventional systems can detect some anomalies, they tend to generate a high number of false positives, thus requiring substantial manual review. The false positive rate may be reduced by lowering the anomaly threshold, but doing so would then substantially increase the false negative rate. Accordingly, more accurate techniques for anomaly detection are desired.

In some implementations, techniques and mechanisms described herein may be used to process multiple seasonal time series metric streams and extract contextual relationship information of the metrics at multiple semantically equivalent time differential windows. Such time windows may be determined automatically by the system. The contextual relationships may be compared at different historical time windows to detect incidents and provide useful information in order to narrow the investigation problem space.

According to various embodiments, techniques and mechanisms described herein provide for sophisticated anomaly detection that takes into consideration multivariate contextual information. For example, multi-level differential time windowing correlations may be employed to drastically reduce false positives. Such techniques may also robustly detect second order anomalies which point to incidents that would be missed by conventional techniques.

In some implementations, embodiments of techniques and mechanisms described herein may provide one or more of several advantages over conventional techniques. For example, incidents may be classified according to severity based on contextual information. As another example, multivariate time-series relationships between metrics and/or incidents may be identified. As another example, the relationships between metrics may reveal probably root causes underlying incidents, which conventional techniques do not address.

In some embodiments, by providing more accurate identification of disruptive anomalous incidents, techniques and mechanisms described herein may provide for improved functioning of the computing system itself. Anomalous incidents such as denial of service attacks, unusual numbers of service requests, unusual workloads, or any other type of unusual activity may be quickly identified and address, thus improving system performance.

Consider the example of Alexandra, who is responsible for monitoring the operational performance of a large-scale on-demand computing services environment. The computing service environment is composed of tens of thousands of computing systems spread across the world. These computing systems each collect many different metrics that shed light on the performance of the systems.

Using conventional techniques, Alexandra is constantly bombarded with false positive incident warnings on some of the systems. These false positives represent relatively normal system performance, but Alexandra must manually evaluate and classify each of them to ensure that truly problematic incidents do not go unnoticed. At the same time, Alexandra sometimes fails to identify incidents on other systems because the conventional detection approaches may have thresholds set too low or may ignore incidents that are reflected in subtle relationships between metrics rather than sharp spikes in individual metrics. The lack of accuracy in identifying anomalous incidents leads to service disruptions for key systems.

In contrast, using techniques and mechanisms described herein, Alexandra may be quickly informed of anomalous incidents anywhere in the system. By analyzing relationships between different metrics over time, the system also helps to reveal to Alexandra the root cause of the anomalous incidents. Accordingly, Alexandra can quickly and accurately correct the problem and reduce or avoid any service disruptions.

FIG. 1 illustrates an example of an overview method for detecting an incident, performed in accordance with one or more embodiments. According to various embodiments, the method 100 may be performed at a database system.

A metric stream that includes a plurality of metrics is retrieved from a database system at 102. Each metric may measure a respective characteristic of the on-demand computing services environment. The metric data stream may include a plurality of values for each of a sequence of time intervals. Each value may correspond with a respective one of the metrics.

According to various embodiments, a metric may be any characteristic for which a value may be collected within a computing environment. Examples of metrics may include, but are not limited to: network bandwidth, a number of service requests received, processor usage, memory usage, a number of database operations, a volume of data transmitted, a volume of data received, a volume of data stored in a database, a volume of data retrieved from a database, or any other relevant information.

Seasonality detection may be performed on the retrieved metric stream at 104. According to various embodiments, multiplicative and/or additive decomposition techniques may be employed to decompose the metric streams. Such techniques may include, but are not limited to, seasonal and trend decomposition using Loess approaches. From the decomposed metric streams, seasonality metadata may be determined for each of the retrieved metrics.

At 106, a dynamic historic window is determined. According to various embodiments, determining a dynamic historic window may involve breaking a time series into its sub-seasonal patterns. The time series may then be annotated to indicate occurrences such as holidays, weekends, service maintenance windows, and/or incident windows. Such annotation may be used to further refine semantic equality relationships of the time series. For instance, semantic information may be used to dynamically select appropriate time windows for comparative analysis. Additional details regarding the dynamic determination of a historic window are discussed throughout the application, and more specifically with reference to FIG. 2.

An adaptive window may be determined at 108. In some implementations, the adaptive window may be automatically determined by identifying historic intervals that are similar to the focal interval. Additional techniques for determining an adaptive window are discussed throughout the application, and more specifically with reference to the method 400 shown in FIG. 4.

Noise cancelation is performed at 110. According to various embodiments, noise cancelation may be performed in order to eliminate false positive signals and reduce multiple alerts for an incident. Noise cancelation may involve running a moving average on top of the calculated anomaly scores over time. The adaptive window selector may determine a periodicity T for applying the moving average. In this way, the short-term fluctuations and random variations may be removed, improving the quality of the resulting signal and allowing it to be grouped as a single entity to classify it as an incident.

At 112, one or more incidents are identified. According to various embodiments, incident detection may involve analyzing the interval T found the adaptive window selector, one or more historic windows S determined by dynamic historic window annotation, and a list of metrics M to detect incidents. Techniques and mechanisms for determining an anomaly score for one or more incidents are discussed throughout the application, and more specifically with respect to the method 700 shown in FIG. 7.

At 114, an anomaly score is stored in the database system. According to various embodiments, the anomaly score may be stored when it exceeds a designated threshold. For example, the designated threshold may be strategically determined so as to separate events that are anomalous from those that are not. The anomaly score may therefore depend on considerations such as the types of metrics being analyzed and the degree of deviation from normal that is considered anomalous.

Figure 2:
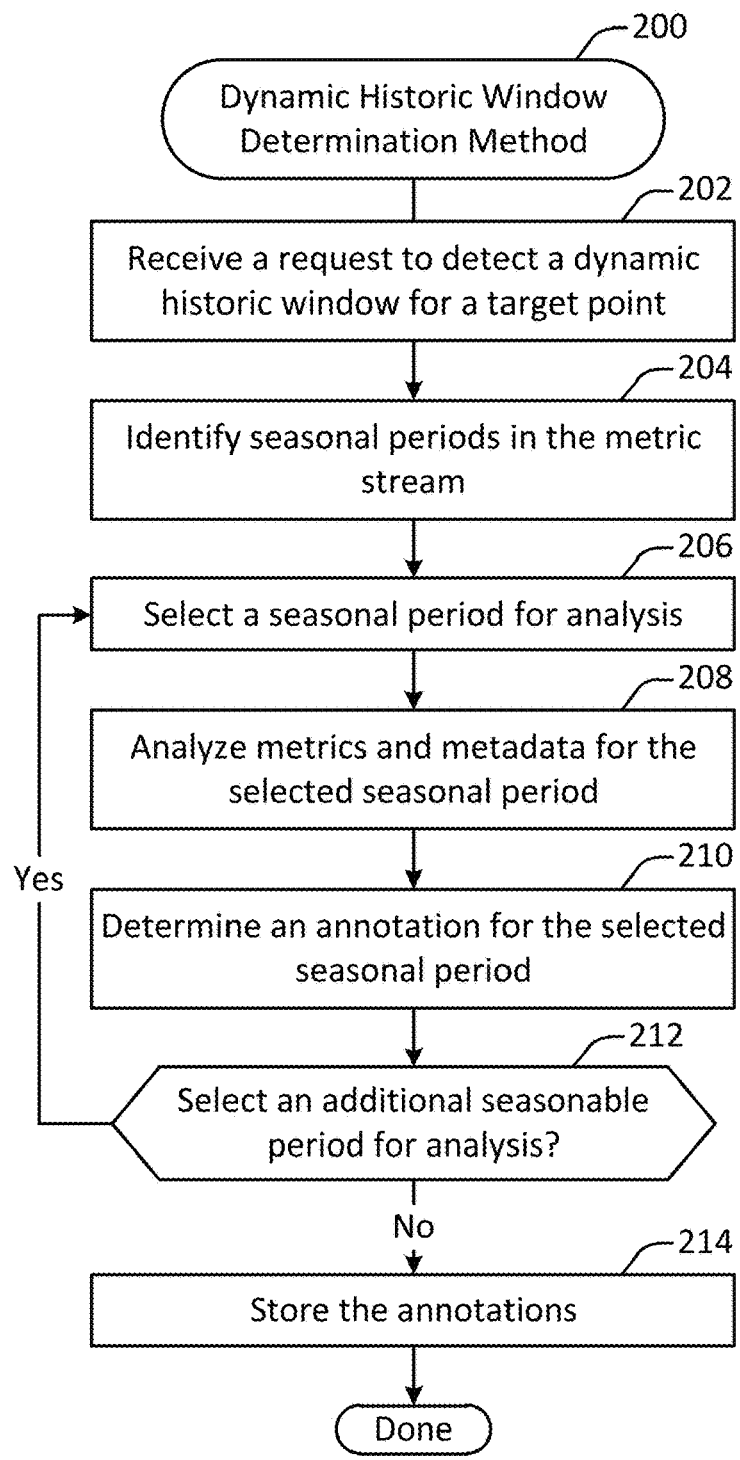
FIG. 2 illustrates an example of a method for performing dynamic historic window determination, performed in accordance with one or more embodiments.

FIG. 2 illustrates an example of a method 200 for performing dynamic historic window determination, performed in accordance with one or more embodiments. According to various embodiments, the method 200 may be performed at or in communication with a database system.

A request to detect a dynamic historic window for a target point is received at 202. In some implementations, the request may be generated as part of a method for detecting an incident. For example, the request may be generated as discussed at operation 106 shown in FIG. 1.

One or more seasonal periods in the metric stream are identified at 204. According to various embodiments, the seasonal periods may be identified as discussed with respect to the operation 104 shown in FIG. 1. For example, multiplicative and/or additive decomposition techniques such as seasonal and trend decomposition using Loess may be employed to decompose the metric stream, and the decomposed stream may then be divided into seasons.

According to various embodiments, seasons may include any suitable period of time. For example, a season may correspond to a day, a week, a month, a year, or any other interval of time. A period of time may also be a member of more than one season. For example, metric values may vary on a daily, weekly, monthly, and yearly basis.

A seasonal period is selected for analysis at 206. According to various embodiments, the seasonal period may be any period identified by the seasonality detection performed at operation 104. For example, the seasonal period may be a day, week, or year in the past. Seasonable periods may be selected for analysis in any suitable order, such as in sequence or in parallel.

Metrics and metadata for the selected seasonal period are analyzed at 208. In some implementations, analyzing metrics and metadata may include determining whether the seasonal period has been identified as anomalous or unusual in any way. For example, calendar information may be retrieved to determine whether a day corresponds to a holiday or weekend. As another example, past incident identification information may be retrieved to determine whether an anomalous incident occurred during the seasonal period. As still another example, service maintenance information may be retrieved to determine whether the selected seasonal period fell during a service maintenance window.

An annotation for the selected seasonal period is determined at 210. The annotation may be determined based on the analysis performed at 208. The annotation may identify one or more characteristics of the seasonal period, such as whether the seasonal period was a holiday or weekend, or fell during a service maintenance period or anomalous incident.

In some implementations, annotation information may be used to further refine the semantic equality relationships of the time-series analysis. This semantic information may then be used to dynamically select the appropriate time windows for comparative analysis. For example, a normal workday may be compared to normal workdays in the past, while a weekend holiday day may be compared to a corresponding weekend holiday day in the past.

A determination is made at 212 as to whether to select an additional seasonal period for analysis. According to various embodiments, additional seasonal periods may be selected for analysis until one or more conditions are met. For example, additional seasonal periods may be selected until all suitable periods have been analyzed. As another example, additional seasonal periods may be selected until the number of comparable seasonal periods exceeds a designated threshold. As still another example, additional seasonal periods may be selected until all seasonal periods in a designated time period have been analyzed.

When it is determined not to select an additional period, the annotations are stored at 214. According to various embodiments, the annotations may be stored for later retrieval during incident detection. By annotating seasonal periods in advance, incident detection may be performed more rapidly.

Figure 3:
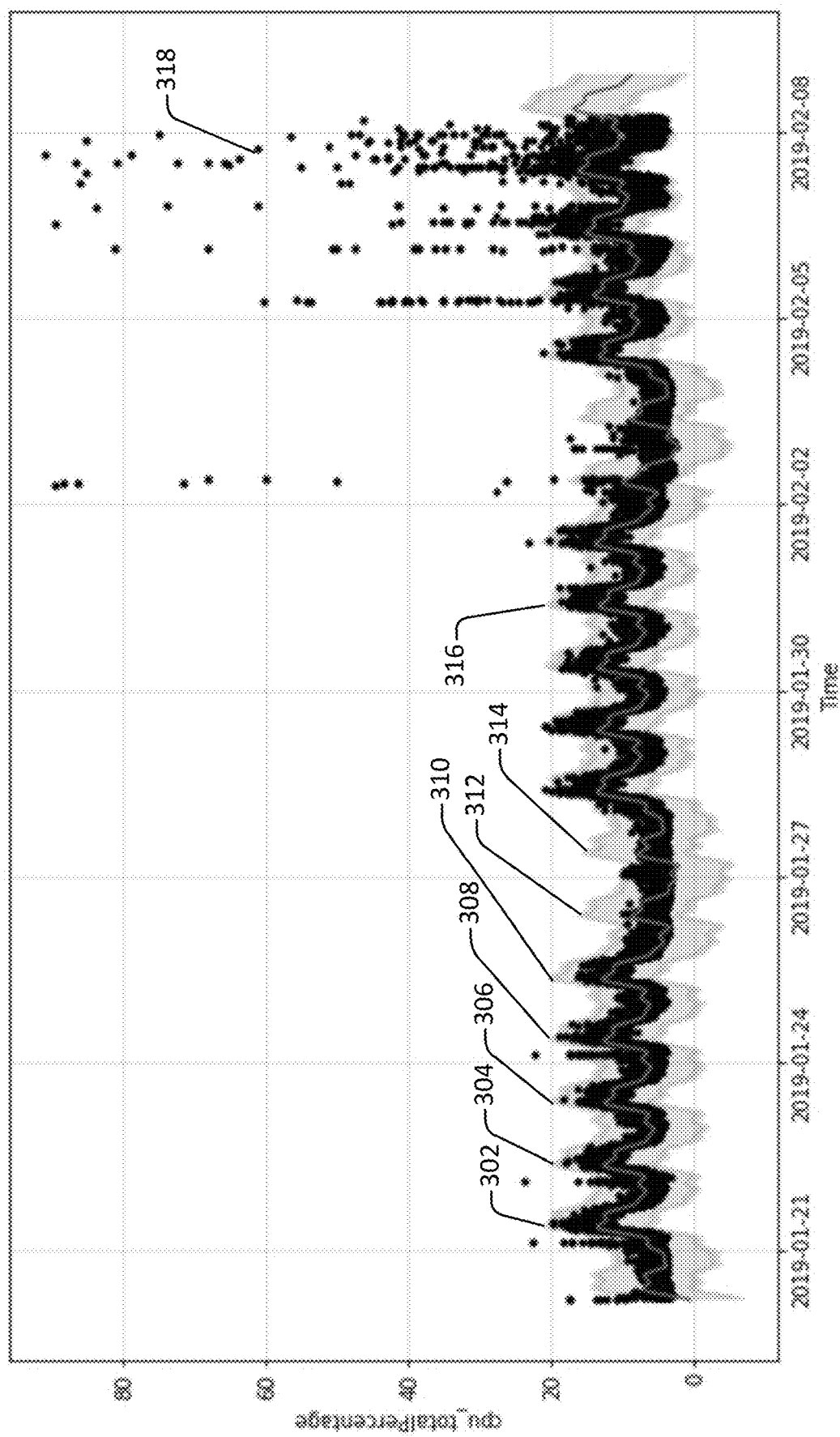
FIG. 3 illustrates an example of a plot illustrating information related to event detection, generated in accordance to one or more embodiments.

FIG. 3 illustrates an example of a plot illustrating information related to event detection, generated in accordance to one or more embodiments. The plot shown in FIG. 3 depicts CPU usage for a computing device over time. The total percentage of CPU cycles employed is plotted on the y-axis, and time on the x-axis.

FIG. 3 shows a seasonal pattern in CPU usage. In particular, CPU usage increases during daytime hours on Monday 302, Tuesday 304, Wednesday 306, Thursday 308, and Friday 310. There is a smaller increase in CPU usage during daytime hours on Saturday 312 and Sunday 314. When determining whether the CPU usage on Thursday 318 is an anomaly, the system may compare the CPU usage to previous Thursdays 308 and 316, and/or to previous workdays 302-310 and 316. Such seasonal periods may be identified as discussed with respect to the operation 104 shown in FIG. 1.

Figure 4:
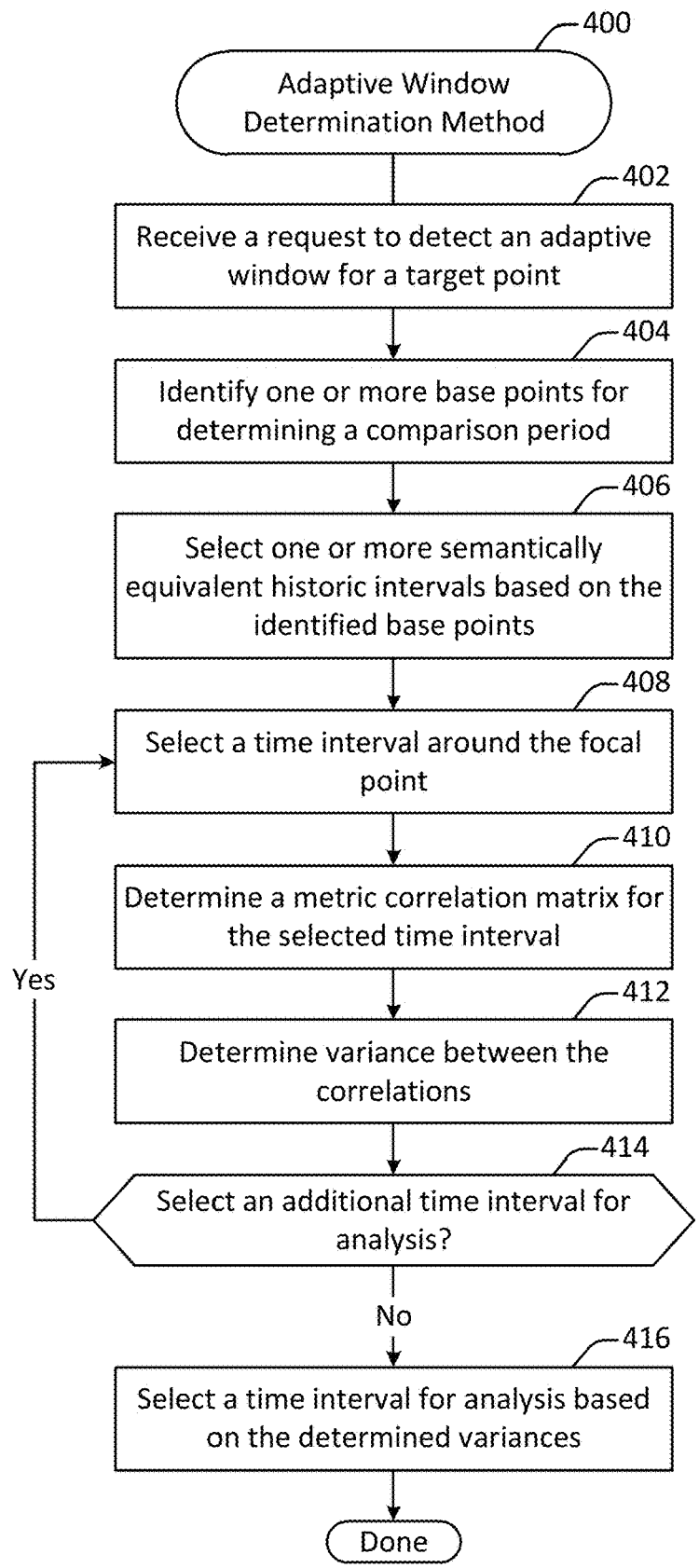
FIG. 4 illustrates an example of a method for performing adaptive window determination, performed in accordance with one or more embodiments.

FIG. 4 illustrates an example of a method 400 for performing adaptive window determination, performed in accordance with one or more embodiments. According to various embodiments, the method 400 may be performed at a database system.

A request to detect an adaptive window for a target point is received at 402. In some implementations, the request may be generated as discussed with respect to operation 108 discussed with respect to the method 100 shown in FIG. 1.

One or more base points for determining a comparison period are identified at 404. In some implementations, the one or more base points may be identified by analyzing metric and/or time values. For example, a base point may be selected based on being a relative outlier value. As another example, a base point may be selected based on being relatively central to a seasonal period. As still another example, a base point may be selected based on being relatively central to a period of time identified as being potentially anomalous. As yet another example, base points may be identified periodically, so that anomaly detection is performed for each of a succession of periods over time.

In some implementations, a base point may be identified based on an analysis of a previous comparison period. For example, the annotations identified in the method 200 may be used to determine one or more previous historic intervals. Then, one or more of these intervals may be analyzed to determine one or more base points. For instance, if the period of time corresponds to a day, then the base points may be identified as the metric values $\mu-2\sigma, \mu-1\sigma, \mu, \mu+1\sigma, \mu+2\sigma$ of the previous valid day, where $\mu$ identifies the metric value mean and a identifies the metric value standard deviation.

One or more semantically equivalent historic intervals based on the identified based points are selected at 406. According to various embodiments, the semantically equivalent historic intervals may be identified based at least in part on the annotations determined in FIG. 2. For example, if the target period falls within a normal weekday, then one or more previous normal weekdays may be selected for analysis. As another example, if the target period falls within a holiday weekend day, then one or more previous holiday weekend days may be selected for analysis.

A time interval around the focal point is selected at 408. In some implementations, the time period to use for anomaly analysis may be strategically determined based on a tradeoff between variance due to small sample size and variance due to comparing data from different periods. If an overly narrow time period is selected, then variance may be excessive because the time period would be too short to have sufficient data for analysis. For example, if a five-second target period around a base point were compared with five-second historical periods, then the five-second period may contain such few metric values that variance would be excessive. However, if a ten-hour target period around a base point were compared with ten-hour historical periods, then the ten-hour period may be so long that shorter anomalies may be missed due to being averaged out with other data. In this case, the ten-hour period may be so long that variance between the metric within the ten-hour time period would be quite high due to time trends within the ten-hour period.

To dynamically determine a suitable time interval, a range of potential time intervals may be examined. For example, in some systems, time intervals from 1 minute to 120 minutes may be analyzed in succession, in increments of 1 minute, 5 minutes, or any suitable increment. Such time intervals may be selected for analysis in sequence, at random, via a binary search, in parallel, or in any suitable order.

A metric correlation matrix for the selected time interval is determined at 410. According to various embodiments, the metric correlation matrix may be determined by computing a correlation matrix for all metric values within the selected time interval. For example, each point in time within the designated time period may be treated as an observation that has values for each of two or more metrics. The correlation matrix may then be determined that identifies a correlation between every pair of metrics.

Variance between the correlations is determined at 412. In some implementations, the variance may be determined by computing the variance formula (1) for the correlation values, where x is a correlation value from the matrix, $\mu$ is the mean of the correlation values from the matrix, and N is the number of correlation values in the matrix.

$$\sigma^2 = \frac{\Sigma(x-\mu)^2}{N} \quad (1)$$

A determination is made at 414 as to whether to select an additional time interval for analysis. As discussed with respect to the operation 408, additional time intervals may be selected according with one or more approaches for dynamically determining a time interval from a range of potential time intervals.

At 416, a time interval is selected for analysis based on the determined variances. In some implementations, the time interval may be selected where the variance between metrics is lowest. Alternately, a time interval may be selected when the variance falls below a designated threshold.

Figure 5:
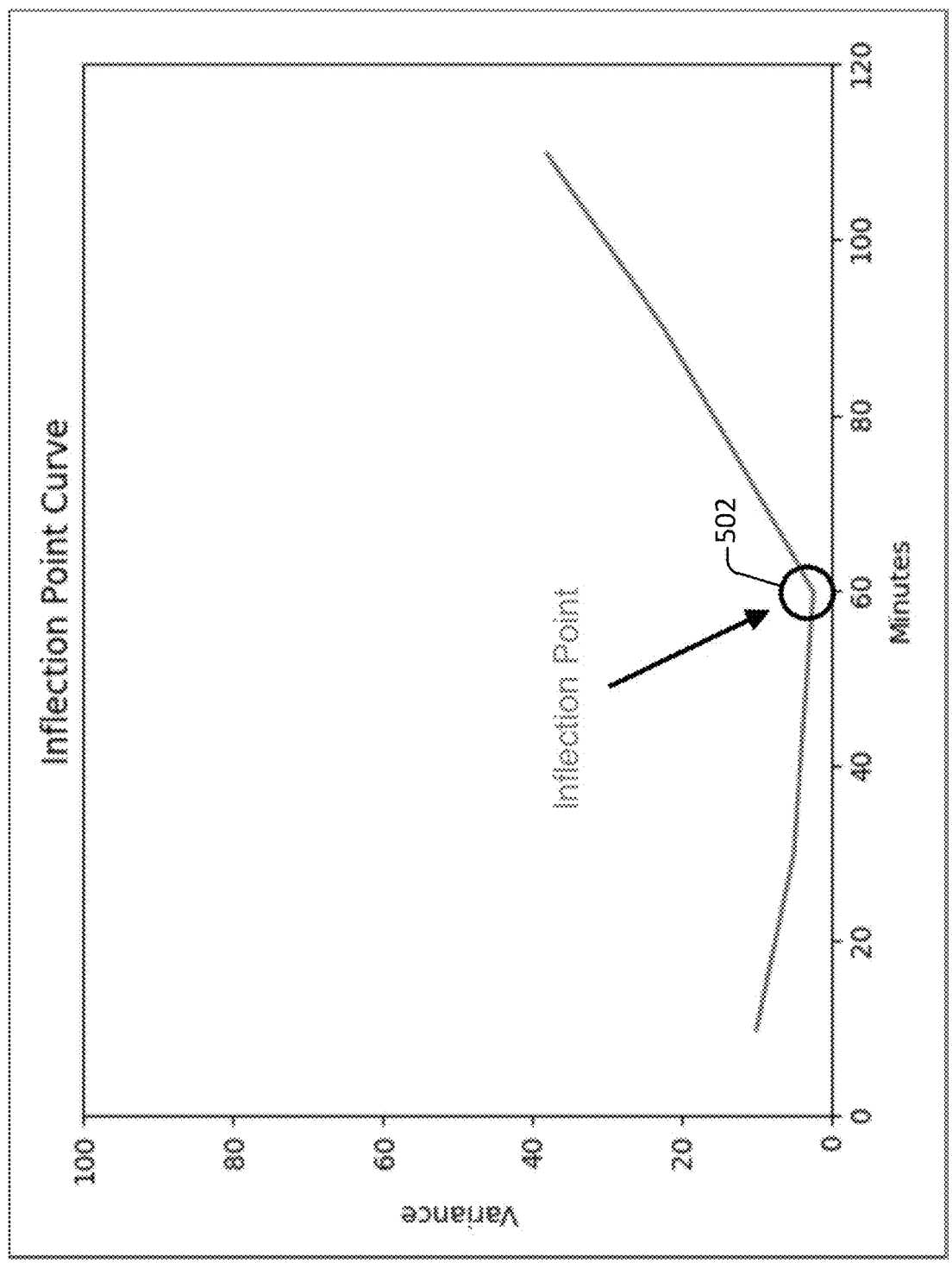
FIG. 5 illustrates an example of a plot illustrating information related to event detection, generated in accordance to one or more embodiments.

FIG. 5 illustrates an example of a plot illustrating information related to event detection, generated in accordance to one or more embodiments. In FIG. 5, variance determined as discussed at operation 412 is plotted on the y-axis, while time intervals are plotted on the x-axis. As shown in FIG. 5, variance decreases as the time interval is expanded to encompass a larger number of observations. However, variance increases past a certain point as the time interval begins to encompass observations that are less related and where time trends begin to appear within the time interval. The inflection point 502, where the variance is lowest, occurs at a time interval of 60 minutes. Accordingly, 60 minutes may be selected as the time interval for analysis.

It should be noted that FIG. 5 is presented only for the purpose of illustration. For example, different systems that have different metrics associated with different system characteristics may yield a different time interval inflection point. As another example, the same system used to generate the plot shown in FIG. 5 may exhibit a different inflection point for a different target time period.

Figure 7:
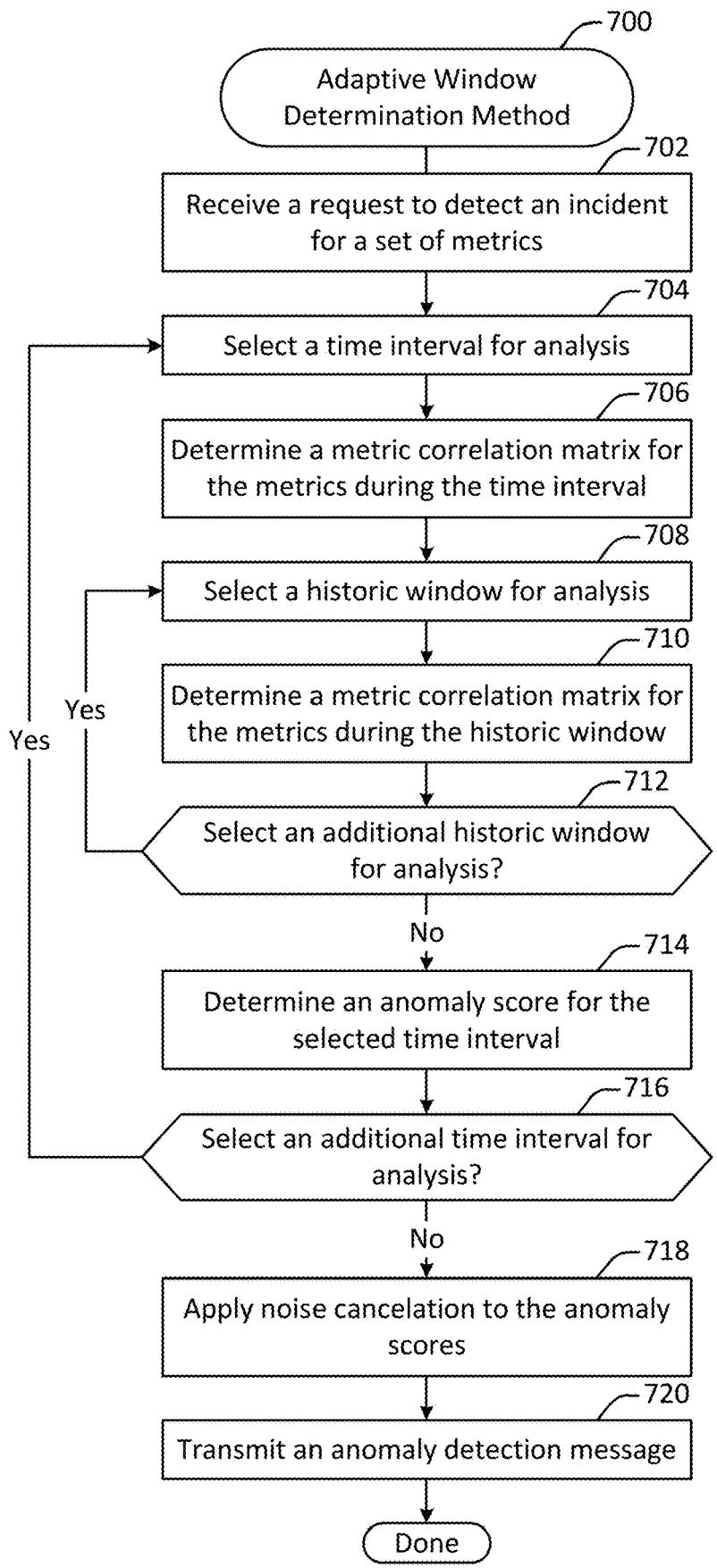
FIG. 7 illustrates an example of a method for detecting an incident, performed in accordance with one or more embodiments.

FIG. 7 illustrates an example of a method 700 for detecting an incident, performed in accordance with one or more embodiments. According to various embodiments, the method 700 may be performed at a database system, such as a database system in an on-demand computing services environment.

A request to detect an incident for a set of metrics during a time interval is received at 702. In some implementations, the request may be generated as discussed with respect to the operation 112 shown in FIG. 1. Accordingly, the request may be generated after the system has identified one or more time intervals T via adaptive window selection at operation 108, one or more dynamic historic windows at operation 106, and a list of metrics have been identified for analysis at operation 102.

At 704, a time interval is selected for analysis. According to various embodiments, a succession of time intervals may be analyzed in sequence to facilitate noise canceling and to ensure that a system is monitored smoothly over a given time period.

A metric correlation matrix is determined for the identified metrics during the time interval at 706. According to various embodiments, the metric correlation matrix may be determined by computing a pairwise correlation for all pairs of metric values within the selected time interval. For example, each point in time within the designated time interval may be treated as an observation that has values for each of two or more metrics. The correlation matrix may then be determined by identifying a correlation between every pair of metrics using the metric values associated with the point-in-time observations.

A historic window is selected for analysis at 708. In some implementations, the historic window may be identified based on the window or windows determined via the method 200 shown in FIG. 2. Historic windows may be selected for analysis in sequence, in parallel, or in any suitable order. For example, a representative sample of historic windows may be selected at random and then analyzed. As another example, each available historic window may be analyzed until all suitable windows have been processed.

A metric correlation matrix is determined for the metrics during the historic window at 710. According to various embodiments, the metric correlation matrix may be determined by computing a pairwise correlation for all pairs of metric values within the selected historic window. For example, each point in time within the selected historic window may be treated as an observation that has values for each of two or more metrics. The correlation matrix may then be determined by identifying a correlation between every pair of metrics using the metric values associated with the point-in-time observations.

A determination is made at 712 as to whether to select an additional historic window for analysis. As discussed with respect to the operation 708, each of one or more dynamically determined historic windows may be analyzed in parallel and/or in any suitable order.

In particular embodiments, the determination made at 712 may be based at least in part on the anomaly score. For example, rather than being computed once at 714, the anomaly score may be computed periodically, such as after the analysis of one or more of the historic windows. Then, the procedure may be terminated when it is determined that the anomaly score is sufficiently stable between analysis of successive historic windows.

An anomaly score for the time interval is determine at 714. In some implementations, the anomaly score may be determined as shown in Equations (2), (3), and (4). First, in equation (2), the historical correlation between the metrics may be calculated by computing an average of the pairwise correlation values. In Equation (1), S represents the number of historic intervals analyzed, k represents an index over those historic intervals, and $Corr_k$ represents the correlation matrix determined at operation 710.

$$Corr_{hist} = \frac{\sum_{k=1}^{S} Corr_k}{S} \quad (2)$$

Next, in Equation (3), the list of correlations of metrics at various historical intervals is determined.

$$C = \forall k \in [1 \ldots S]\{k \to Corr_k\} \quad (3)$$

Finally, in Equation (4), the values computed in Equations (2) and (3) may be combined to determine an anomaly score for the time interval. In Equation (4), variables i and j index the metrics included in the analysis. The anomaly score computed in Equation (4) represents the cumulative sum of the difference between the Historic Correlations and the Correlations at the given point of time normalized by its variance.

$$AnomalyScore = \sum_{\forall (i,j) \in M, i \neq j} \left[ \frac{(Corr_{i,j})_{hist} - (Corr_{i,j})_{curr}}{\sigma^2(C)} \right] \quad (4)$$

A determination is made at 716 as to whether to select an additional time interval for analysis. According to various embodiments, a succession of anomaly scores may be determined over time for a sequence of time intervals.

At 718, noise cancelation is applied to the determined anomaly score. In some implementations, noise cancelation may be performed to eliminate false positives and/or to reduce multiple alerts for an incident. To perform noise canceling, a moving average may be determined for the calculated anomaly scores over time. The periodicity of the moving average may be based on the length of the time T identified by adaptive window selection. Removing the short-term fluctuations and random variations allows the quality of the resultant signal to be grouped as a single entity to classify it as an incident.

An anomaly detection message is transmitted at 720. In some implementations, each of the anomaly scores may be stored in a database system. Alternately, or additionally, each of the de-noised anomaly scores may be stored in a database system.

In some implementations, an anomaly detection message may identify whether an anomaly has occurred. For example, the anomaly detection may be transmitted to a system administrator or a remote machine. The system may determine that an anomaly has occurred when the anomaly score exceeds a designated threshold. In general, the incident represented in the selected time interval is more unusual and/or of higher severity as the anomaly score increases. However, the designated threshold for determining that an incident has occurred may be strategically selected based on information such as the type of incident being detected and the degree of deviation from normal that is considered acceptable.

In some implementations, an anomaly detection may include information instead of, or in addition to, one or more anomaly scores. Such information may include, but is not limited to: an indication of the duration of the incident, an indication of the severity of the incident, a list of metrics deviating from the usual behavior of the system, and an incident plot such as the plots shown in FIGS. 3, 5, and 6.

Figure 6:
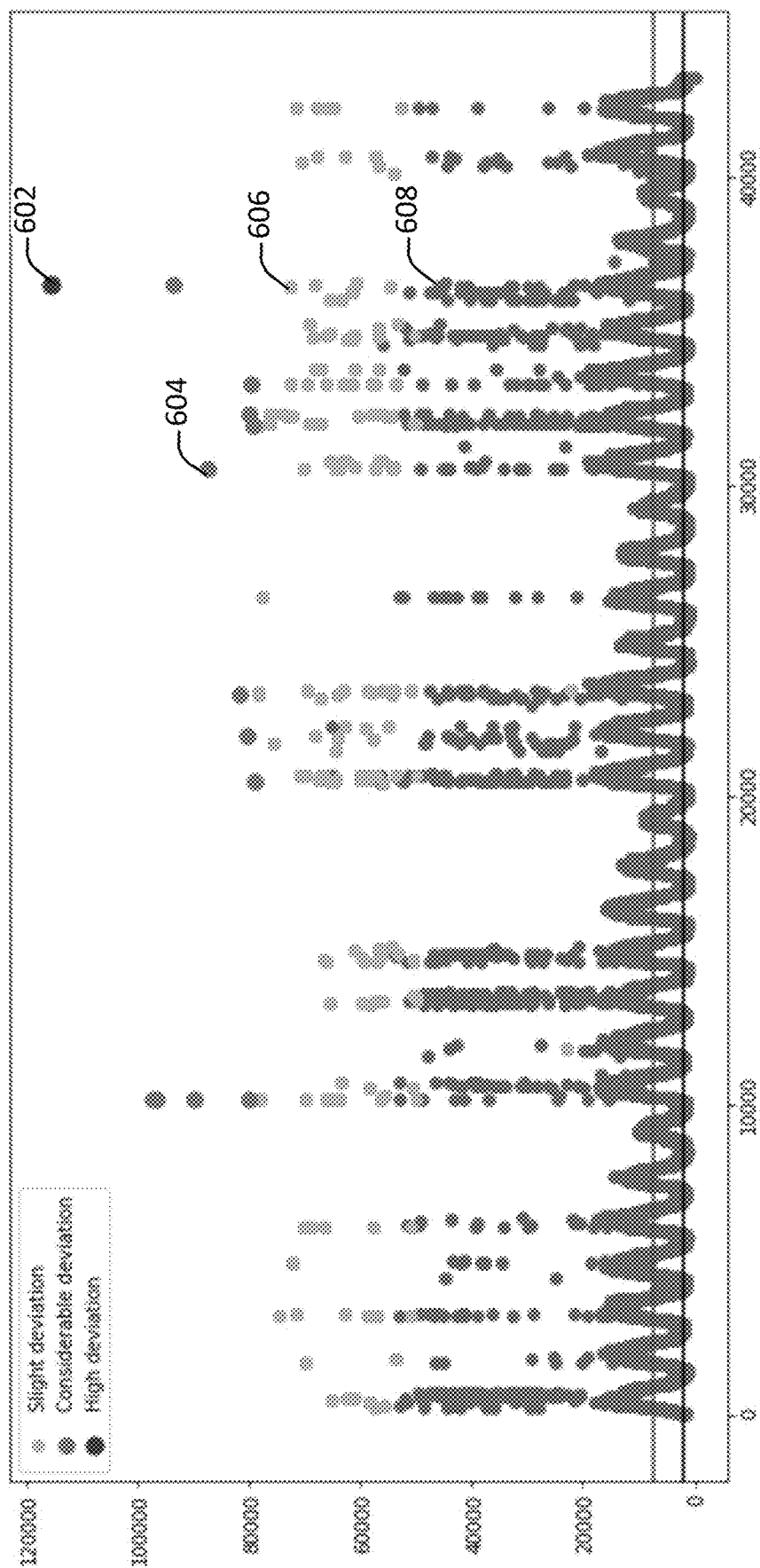
FIG. 6 illustrates an example of a plot illustrating information related to event detection, generated in accordance to one or more embodiments.

FIG. 6 illustrates an example of a plot illustrating information related to event detection, generated in accordance to one or more embodiments. In FIG. 6, the anomaly score for successive time intervals is plotted on the y-axis, while time is plotted on the x-axis.

In FIG. 6, the anomaly score 602 represents a high deviation from normal. The anomaly score 604 represents a considerable deviation from normal. The anomaly score 606 represents a slight deviation from normal. The anomaly score 608 represents a relatively normal score.

As shown in FIG. 6, in many systems high anomaly scores periodically occur due to normal variation in system performance. However, an anomaly may be identified if the moving average of these anomaly scores exceeds a designated threshold.

Figure 8:
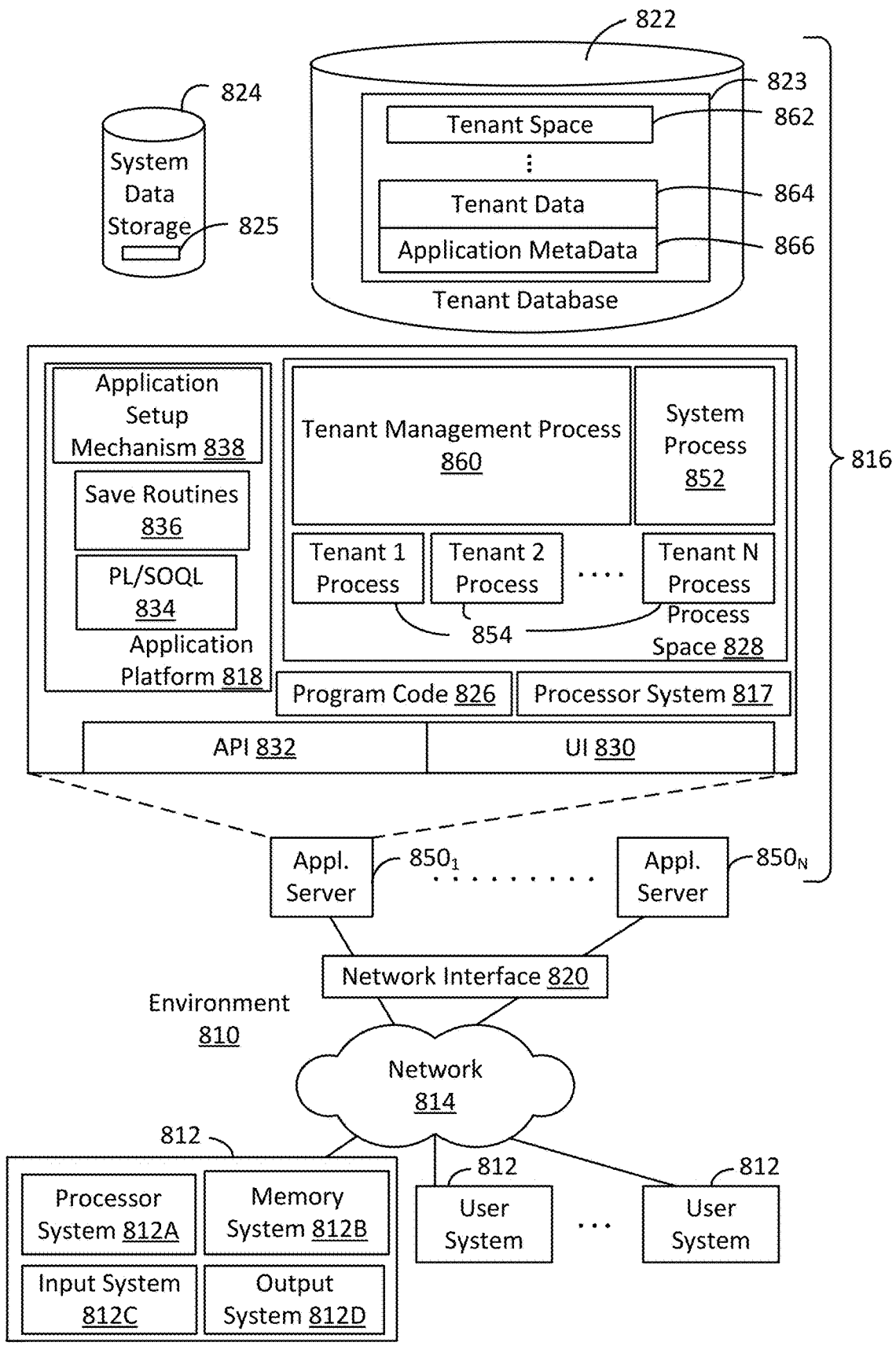
FIG. 8 illustrates a block diagram of an example of an environment that includes an on-demand database service configured in accordance with some implementations, configured in accordance with one or more embodiments.

FIG. 8 shows a block diagram of an example of an environment 810 that includes an on-demand database service configured in accordance with some implementations. Environment 810 may include user systems 812, network 814, database system 816, processor system 817, application platform 818, network interface 820, tenant data storage 822, tenant data 823, system data storage 824, system data 825, program code 826, process space 828, User Interface (UI) 830, Application Program Interface (API) 832, PL/SOQL 834, save routines 836, application setup mechanism 838, application servers 850-1 through 850-N, system process space 852, tenant process spaces 854, tenant management process space 860, tenant storage space 862, user storage 864, and application metadata 866. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 816, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 816. Such applications may be developed by the database service provider or by users or third-party application developers accessing the service. Application platform 818 includes an application setup mechanism 838 that supports application developers' creation and management of applications, which may be saved as metadata into tenant data storage 822 by save routines 836 for execution by subscribers as one or more tenant process spaces 854 managed by tenant management process 860 for example. Invocations to such applications may be coded using PL/SOQL 834 that provides a programming language style interface extension to API 832. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 866 for a subscriber making such an invocation. Such system processes may also manage execution of application metadata 866 as an application in a virtual machine.

In some implementations, each application server 850 may handle requests for any user associated with any organization. A load balancing function (e.g., an F5 Big-IP load balancer) may distribute requests to the application servers 850 based on an algorithm such as least-connections, round robin, observed response time, etc. Each application server 850 may be configured to communicate with tenant data storage 822 and the tenant data 823 therein, and system data storage 824 and the system data 825 therein to serve requests of user systems 812. The tenant data 823 may be divided into individual tenant storage spaces 862, which can be either a physical arrangement and/or a logical arrangement of data. Within each tenant storage space 862, user storage 864 and application metadata 866 may be similarly allocated for each user. For example, a copy of a user's most recently used (MRU) items might be stored to user storage 864. Similarly, a copy of MRU items for an entire tenant organization may be stored to tenant storage space 862. A UI 830 provides a user interface and an API 832 provides an application programming interface to system 816 resident processes to users and/or developers at user systems 812.

System 816 may implement a web-based database system. For example, in some implementations, system 816 may include application servers configured to implement and execute various software applications. The application servers may be configured to provide related data, code, forms, web pages and other information to and from user systems 812. Additionally, the application servers may be configured to store information to, and retrieve information from a database system. Such information may include related data, objects, and/or Webpage content. With a multi-tenant system, data for multiple tenants may be stored in the same physical database object in tenant data storage 822, however, tenant data may be arranged in the storage medium(s) of tenant data storage 822 so that data of one tenant is kept logically separate from that of other tenants. In such a scheme, one tenant may not access another tenant's data, unless such data is expressly shared.

Several elements in the system shown in FIG. 8 include conventional, well-known elements that are explained only briefly here. For example, user system 812 may include processor system 812A, memory system 812B, input system 812C, and output system 812D. A user system 812 may be implemented as any computing device(s) or other data processing apparatus such as a mobile phone, laptop computer, tablet, desktop computer, or network of computing devices. User system 12 may run an internet browser allowing a user (e.g., a subscriber of an MIS) of user system 812 to access, process and view information, pages and applications available from system 816 over network 814. Network 814 may be any network or combination of networks of devices that communicate with one another, such as any one or any combination of a LAN (local area network), WAN (wide area network), wireless network, or other appropriate configuration.

The users of user systems 812 may differ in their respective capacities, and the capacity of a particular user system 812 to access information may be determined at least in part by "permissions" of the particular user system 812. As discussed herein, permissions generally govern access to computing resources such as data objects, components, and other entities of a computing system, such as a social networking system, and/or a CRM database system. "Permission sets" generally refer to groups of permissions that may be assigned to users of such a computing environment. For instance, the assignments of users and permission sets may be stored in one or more databases of System 816. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 816 may provide on-demand database service to user systems 812 using an MIS arrangement. By way of example, one tenant organization may be a company that employs a sales force where each salesperson uses system 816 to manage their sales process. Thus, a user in such an organization may maintain contact data, leads data, customer follow-up data, performance data, goals and progress data, etc., all applicable to that user's personal sales process (e.g., in tenant data storage 822). In this arrangement, a user may manage his or her sales efforts and cycles from a variety of devices, since relevant data and applications to interact with (e.g., access, view, modify, report, transmit, calculate, etc.) such data may be maintained and accessed by any user system 812 having network access.

When implemented in an MTS arrangement, system 816 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 816 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 816 may also maintain system-level data usable by multiple tenants or other data. Such system-level data may include industry reports, news, postings, and the like that are sharable between tenant organizations.

In some implementations, user systems 812 may be client systems communicating with application servers 850 to request and update system-level and tenant-level data from system 816. By way of example, user systems 812 may send one or more queries requesting data of a database maintained in tenant data storage 822 and/or system data storage 824. An application server 850 of system 816 may automatically generate one or more SQL statements (e.g., one or more SQL queries) that are designed to access the requested data. System data storage 824 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. In some implementations, a database may store metric information. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 9A:
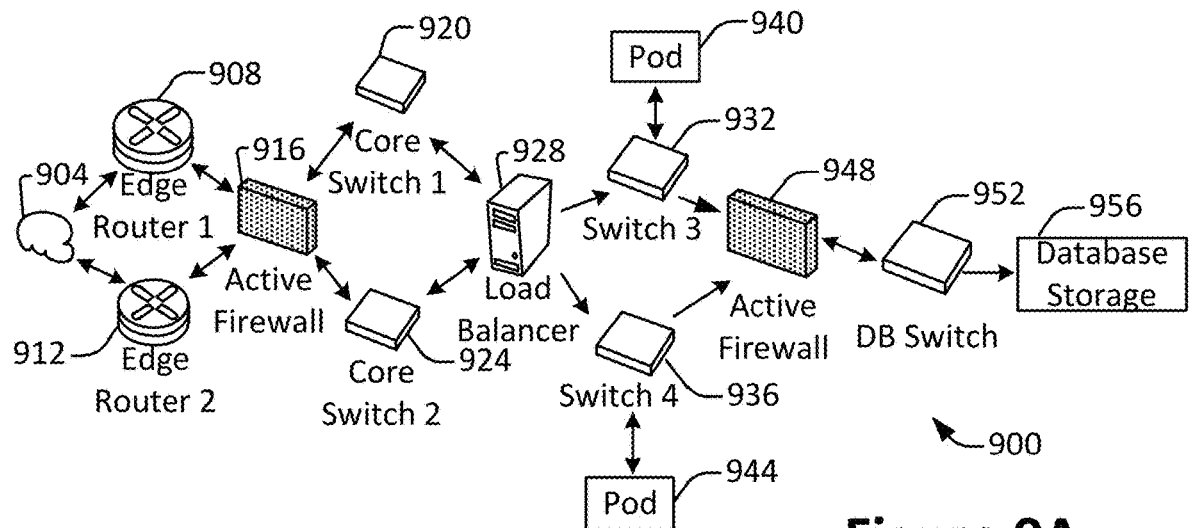
FIG. 9A shows a system diagram of an example of architectural components of an on-demand database service environment, configured in accordance with some implementations.

FIG. 9A shows a system diagram of an example of architectural components of an on-demand database service environment 900, configured in accordance with some implementations. A client machine located in the cloud 904 may communicate with the on-demand database service environment via one or more edge routers 908 and 912. A client machine may include any of the examples of user systems ?12 described above. The edge routers 908 and 912 may communicate with one or more core switches 920 and 924 via firewall 916. The core switches may communicate with a load balancer 928, which may distribute server load over different pods, such as the pods 940 and 944 by communication via pod switches 932 and 936. The pods 940 and 944, which may each include one or more servers and/or other computing resources, may perform data processing and other operations used to provide on-demand services. Components of the environment may communicate with a database storage 956 via a database firewall 948 and a database switch 952.

Accessing an on-demand database service environment may involve communications transmitted among a variety of different components. The environment 900 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 9A and 9B.

The cloud 904 refers to any suitable data network or combination of data networks, which may include the Internet. Client machines located in the cloud 904 may communicate with the on-demand database service environment 900 to access services provided by the on-demand database service environment 900. By way of example, client machines may access the on-demand database service environment 900 to retrieve, store, edit, and/or process metric information.

In some implementations, the edge routers 908 and 912 route packets between the cloud 904 and other components of the on-demand database service environment 900. The edge routers 908 and 912 may employ the Border Gateway Protocol (BGP). The edge routers 908 and 912 may maintain a table of IP networks or 'prefixes', which designate network reachability among autonomous systems on the internet.

In one or more implementations, the firewall 916 may protect the inner components of the environment 900 from internet traffic. The firewall 916 may block, permit, or deny access to the inner components of the on-demand database service environment 900 based upon a set of rules and/or other criteria. The firewall 916 may act as one or more of a packet filter, an application gateway, a stateful filter, a proxy server, or any other type of firewall.

In some implementations, the core switches 920 and 924 may be high-capacity switches that transfer packets within the environment 900. The core switches 920 and 924 may be configured as network bridges that quickly route data between different components within the on-demand database service environment. The use of two or more core switches 920 and 924 may provide redundancy and/or reduced latency.

In some implementations, communication between the pods 940 and 944 may be conducted via the pod switches 932 and 936. The pod switches 932 and 936 may facilitate communication between the pods 940 and 944 and client machines, for example via core switches 920 and 924. Also or alternatively, the pod switches 932 and 936 may facilitate communication between the pods 940 and 944 and the database storage 956. The load balancer 928 may distribute workload between the pods, which may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948, which may act as a computer application firewall operating at the database application layer of a protocol stack. The database firewall 948 may protect the database storage 956 from application attacks such as structure query language (SQL) injection, database rootkits, and unauthorized information disclosure. The database firewall 948 may include a host using one or more forms of reverse proxy services to proxy traffic before passing it to a gateway router and/or may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, the database storage 956 may be an on-demand database system shared by many different organizations. The on-demand database service may employ a single-tenant approach, a multi-tenant approach, a virtualized approach, or any other type of database approach. Communication with the database storage 956 may be conducted via the database switch 952. The database storage 956 may include various software components for handling database queries. Accordingly, the database switch 952 may direct database queries transmitted by other components of the environment (e.g., the pods 940 and 944) to the correct components within the database storage 956.

Figure 9B:
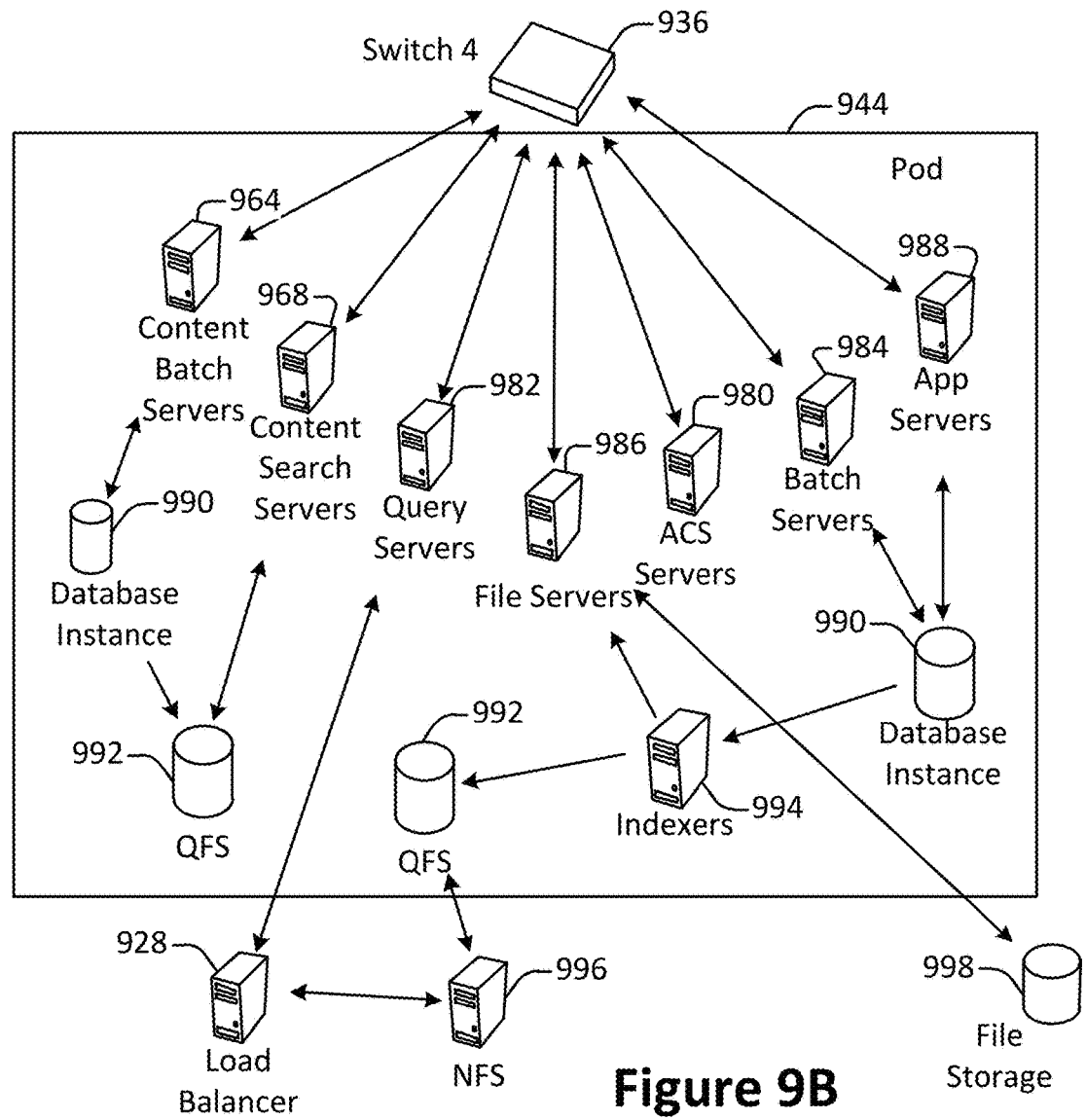
FIG. 9B shows a system diagram further illustrating an example of architectural components of an on-demand database service environment, in accordance with some implementations.

FIG. 9B shows a system diagram further illustrating an example of architectural components of an on-demand database service environment, in accordance with some implementations. The pod 944 may be used to render services to user(s) of the on-demand database service environment 900. The pod 944 may include one or more content batch servers 964, content search servers 968, query servers 982, file servers 986, access control system (ACS) servers 980, batch servers 984, and app servers 988. Also, the pod 944 may include database instances 990, quick file systems (QFS) 992, and indexers 994. Some or all communication between the servers in the pod 944 may be transmitted via the switch 936.

In some implementations, the app servers 988 may include a framework dedicated to the execution of procedures (e.g., programs, routines, scripts) for supporting the construction of applications provided by the on-demand database service environment 900 via the pod 944. One or more instances of the app server 988 may be configured to execute all or a portion of the operations of the services described herein.

In some implementations, as discussed above, the pod 944 may include one or more database instances 990. A database instance 990 may be configured as an MTS in which different organizations share access to the same database, using the techniques described above. Database information may be transmitted to the indexer 994, which may provide an index of information available in the database 990 to file servers 986. The QFS 992 or other suitable filesystem may serve as a rapid-access file system for storing and accessing information available within the pod 944. The QFS 992 may support volume management capabilities, allowing many disks to be grouped together into a file system. The QFS 992 may communicate with the database instances 990, content search servers 968 and/or indexers 994 to identify, retrieve, move, and/or update data stored in the network file systems (NFS) 996 and/or other storage systems.

In some implementations, one or more query servers 982 may communicate with the NFS 996 to retrieve and/or update information stored outside of the pod 944. The NFS 996 may allow servers located in the pod 944 to access information over a network in a manner similar to how local storage is accessed. Queries from the query servers 922 may be transmitted to the NFS 996 via the load balancer 928, which may distribute resource requests over various resources available in the on-demand database service environment 900. The NFS 996 may also communicate with the QFS 992 to update the information stored on the NFS 996 and/or to provide information to the QFS 992 for use by servers located within the pod 944.

In some implementations, the content batch servers 964 may handle requests internal to the pod 944. These requests may be long-running and/or not tied to a particular customer, such as requests related to log mining, cleanup work, and maintenance tasks. The content search servers 968 may provide query and indexer functions such as functions allowing users to search through content stored in the on-demand database service environment 900. The file servers 986 may manage requests for information stored in the file storage 998, which may store information such as documents, images, basic large objects (BLOBs), etc. The query servers 982 may be used to retrieve information from one or more file systems. For example, the query system 982 may receive requests for information from the app servers 988 and then transmit information queries to the NFS 996 located outside the pod 944. The ACS servers 980 may control access to data, hardware resources, or software resources called upon to render services provided by the pod 944. The batch servers 984 may process batch jobs, which are used to run tasks at specified times. Thus, the batch servers 984 may transmit instructions to other servers, such as the app servers 988, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

In particular embodiments, a database system may employ object relational mapping to provide for a dynamic schema database. In such a configuration, different rows in the same database table may correspond with different database objects. The characteristics of columns in the database may be specified by an object relational mapping definition, for instance in a universal data dictionary. For instance, one row may correspond to a contact object, where a particular column identifies a name associated with the contact. However, a different row in the same database may correspond to an organization object, where the same column instead identifies an email address associated with the organization.

Figure 10:
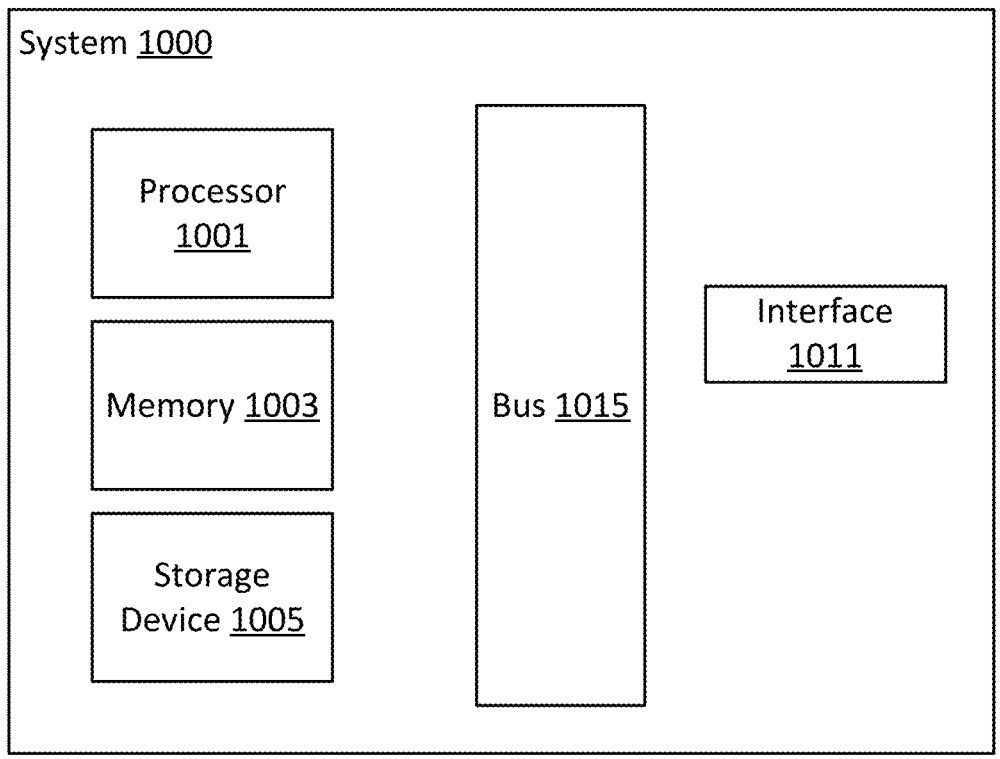
FIG. 10 illustrates one example of a computing device, configured in accordance with one or more embodiments.

FIG. 10 illustrates one example of a computing device. According to various embodiments, a system 1000 suitable for implementing embodiments described herein includes a processor 1001, a memory module 1003, a storage device 1005, an interface 1011, and a bus 1015 (e.g., a PCI bus or other interconnection fabric.) System 1000 may operate as variety of devices such as an application server, a database server, or any other device or service described herein. Although a particular configuration is described, a variety of alternative configurations are possible. The processor 1001 may perform operations such as those described herein. Instructions for performing such operations may be embodied in the memory 1003, on one or more non-transitory computer readable media, or on some other storage device. Various specially configured devices can also be used in place of or in addition to the processor 1001. The interface 1011 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A computer-implemented method implemented in a database system within an on-demand computing services environment, the method comprising:
    retrieving from the database system a metric data stream for a plurality of metrics, each metric measuring a respective computing characteristic, the metric data stream including a plurality of values for each of a sequence of time intervals, each value corresponding with a respective one of the metrics;
    determining, using one or more processors, a plurality of metric correlation matrices for the metrics, each metric correlation matrix associated with a respective time period in the metric data stream, each time period including a respective plurality of the time intervals;
    selecting, using one or more processors, a subset of comparison metric correlation matrices from the plurality of metric correlation metric matrices;
    determining via a processor a plurality of anomaly scores each corresponding with a respective time period, the plurality of anomaly scores including a designated anomaly score for a designated time period determined by comparing a designated metric correlation matrix associated with the designated time period with the selected subset of comparison metric correlation metric matrices;
    determining a plurality of moving average anomaly scores, each moving average anomaly score representing a respective average of the anomaly scores associated with a respective time window; and
    when it is determined that the designated anomaly score exceeds a designated threshold, storing the designated anomaly score in the database system.

2. The computer-implemented method recited in claim 1, the method further comprising:
    performing seasonality detection on the metric stream to identify a plurality of season periods, one or more of the metric values varying systematically with the season periods.

3. The computer-implemented method recited in claim 2, the method further comprising:
    determining a respective annotation value for each of the identified season periods via dynamic historic window annotation, the annotation value being selected from a set of season period classification values.

4. The computer-implemented method recited in claim 3, wherein each of the subset of comparison metric correlation matrices corresponds to a respective one of the identified season periods.

5. The computer-implemented method recited in claim 4, wherein the subset of metric correlation matrices are selected based on the annotation values.

6. The computer-implemented method recited in claim 2, wherein performing seasonality detection comprises applying seasonal and trend decomposition using Loess.

7. The computer-implemented method recited in claim 1, wherein each of the metrics corresponds to a respective value measured at a computing system.

8. The computer-implemented method recited in claim 7, wherein the computing system represents a portion of the on-demand computing services environment, the on-demand computing services environment configured to provide computing services to a plurality of service recipients via the internet.

9. The computer-implemented method recited in claim 1, wherein the database system includes a multitenant database storing information associated with a plurality of tenants.

10. The computer-implemented method recited in claim 1, wherein the database system includes a dynamic-schema database in which database column attributes are dynamically determined based on object relational mapping.

11. A computing system within an on-demand computing services environment, the computing system configured to perform a method comprising:
retrieving from the database system a metric data stream for a plurality of metrics, each metric measuring a respective computing characteristic, the metric data stream including a plurality of values for each of a sequence of time intervals, each value corresponding with a respective one of the metrics;
determining, using one or more processors, a plurality of metric correlation matrices for the metrics, each metric correlation matrix associated with a respective time period in the metric data stream, each time period including a respective plurality of the time intervals;
selecting, using one or more processors, a subset of comparison metric correlation matrices from the plurality of metric correlation metric matrices;
determining via a processor a plurality of anomaly scores each corresponding with a respective time period, the plurality of anomaly scores including a designated anomaly score for a designated time period determined by comparing a designated metric correlation matrix associated with the designated time period with the selected subset of comparison metric correlation metric matrices;
determining a plurality of moving average anomaly scores, each moving average anomaly score representing a respective average of the anomaly scores associated with a respective time window; and
when it is determined that the designated anomaly score exceeds a designated threshold, storing the designated anomaly score in the database system.

12. The computing system recited in claim 11, the method further comprising:
performing seasonality detection on the metric stream to identify a plurality of season periods, one or more of the metric values varying systematically with the season periods.

13. The computing system recited in claim 12, the method further comprising:
determining a respective annotation value for each of the identified season periods via dynamic historic window annotation, the annotation value being selected from a set of season period classification values.

14. The computing system recited in claim 13, wherein each of the subset of comparison metric correlation matrices corresponds to a respective one of the identified season periods.

15. The computing system recited in claim 14, wherein the subset of metric correlation matrices are selected based on the annotation values.

16. The computing system recited in claim 12, wherein performing seasonality detection comprises applying seasonal and trend decomposition using Loess.

17. The computing system recited in claim 11, wherein each of the metrics corresponds to a respective value measured at a computing system.

18. The computing system recited in claim 17, wherein the computing system represents a portion of an on-demand computing services environment configured to provide computing services to a plurality of service recipients via the internet.

19. One or more non-transitory computer readable media having instructions stored thereon for performing a computer-implemented method implemented in a database system within an on-demand computing services environment, the method comprising:
retrieving from the database system a metric data stream for a plurality of metrics, each metric measuring a respective computing characteristic, the metric data stream including a plurality of values for each of a sequence of time intervals, each value corresponding with a respective one of the metrics;
determining, using one or more processors, a plurality of metric correlation matrices for the metrics, each metric correlation matrix associated with a respective time period in the metric data stream, each time period including a respective plurality of the time intervals;
selecting, using one or more processors, a subset of comparison metric correlation matrices from the plurality of metric correlation metric matrices;
determining via a processor a plurality of anomaly scores each corresponding with a respective time period, the plurality of anomaly scores including a designated anomaly score for a designated time period determined by comparing a designated metric correlation matrix associated with the designated time period with the selected subset of comparison metric correlation metric matrices;
determining a plurality of moving average anomaly scores, each moving average anomaly score representing a respective average of the anomaly scores associated with a respective time window; and
when it is determined that the designated anomaly score exceeds a designated threshold, storing the designated anomaly score in the database system.

\* \* \* \* \*